United States Patent Office 3,644,443
Patented Feb. 22, 1972

3,644,443
PREPARATION OF CARBOXYLIC ACIDS
Ronald L. Shubkin, Oak Park, Mich., assignor to Ethyl
Corporation, New York, N.Y.
No Drawing. Filed Dec. 8, 1969, Ser. No. 883,307
Int. Cl. C07c 51/14
U.S. Cl. 260—413                                14 Claims

ABSTRACT OF THE DISCLOSURE

An integral process for preparing carboxylic acids from olefins having about 10 or more carbon atoms containing water and carbon monoxide using a cobalt catalyst and a ketone or ether solvent combined with a cobalt recovery step which permits direct recycle of the catalyst so recovered for use in the carboxylation process.

BACKGROUND OF THE INVENTION

The subject matter of the present invention is a process for preparing carboxylic acids from $C_{10}$ and higher olefins, water and carbon monoxide using a cobalt catalyst in a ketone or ether solvent in combination with the cobalt recovery step.

The preparation of carboxylic acids from water and carbon monoxide and an olefin using a cobalt catalyst is a well-known reaction (carboxylation). The use of solvents which includes ketones is also known to improve this process when lower molecular weight olefins are the reactants (U.S. 2,911,422). Recovery of the cobalt catalyst in such a system is always desirable and a cobalt recovery system which permits direct use of the recovered cobalt is of even greater advantage.

It has been discovered that the cobalt catalyst can be recovered from a carboxylation process by treatment with a low molecular weight carboxylic acid. The recovered catalyst can be used directly in the carboxylation process.

SUMMARY OF THE INVENTION

An integral process for preparing carboxylic acids by reacting olefin having about 10 or more carbon atoms with water and carbon monoxide (CO) using a cobalt catalyst in the presence of a ketone or ether solvent wherein the amount of solvent is from about 30% to about 50% by weight of the minimum amount of solvent required to form a solution of the olefin and water reactants at room temperature and subsequently recovering cobalt catalyst by treating the reaction with an aqueous solution of a $C_2$–$C_3$ monoalkanoic acid and thus obtaining cobalt catalyst suitable for direct use in the carboxylation process.

DESCRIPTION OF THE PREFERRED EMBODIMENTS

A preferred embodiment is a process for preparing carboxylic acids which comprises (1) Reacting olefin having about 10 or more carbon atoms with water and carbon monoxide using a cobalt catalyst in the presence of a solvent selected from the class consisting of alkyl ketones having up to 11 carbon atoms and alkyl ethers having from about 4 to about 16 carbon atoms, the amount of solvent used being from about 30% to about 50% by weight of the amount of said solvent which is required to form a solution of the olefin and water at room temperature, said reaction being carried out at temperatures ranging from 125° C. to 175° C., and at pressures of at least 750 p.s.i., whereby a carboxylic acid is produced, (2) Treating the resultant reaction mixture of step (1) with an aqueous solution of a $C_2$–$C_3$ monoalkanoic acid, at temperatures ranging from 125° C. to 175° C., said treatment causing said reaction mixture to form two layers on cooling to room temperature, (3) Separating the cobalt containing layer from the supernatant layer containing said carboxylic acid, and (4) Thus recovering cobalt catalyst suitable for direct use in step (1).

In a more preferred embodiment, the treatment with the $C_2$–$C_3$ monoalkanoic acid is carried out under carbon monoxide gas in the substantial absence of hydrogen. Ketones are preferred solvents. Acetic acid is a preferred carboxylic acid.

In another preferred embodiment in linearity promoting quantity of a pyridine is present in the carboxylation reaction of step (1). Pyridine is a most preferred promoter.

Olefins having about 10 or more carbon atoms are useful in the present invention; the designation $C_{10+}$ is used herein to indicate such olefins. The term olefins means any organic compound having at least 1 non-aromatic, carbon-to-carbon double bond. It includes compounds having one (monoolefin) or more (polyolefin) of such carbon-to-carbon double bonds. Cyclic compounds as well as acyclic olefins, branched as well as linear olefins are included. Useful olefins may also contain other functional groups such as halide, carboxy, carbonyl, hydroxide and the like, provided that these functional groups do not adversely effect the process of the present invention. Examples of useful olefins are 6-phenylhexene-1, oleic acid, cyclododecatriene, 4 - chloropentadecene-1, 2-ethyldodecene-1, decene-2, triacontene, tetracontene, 1,18-nonadecadiene, 1,3-tetracosadiene, ricinoleic acid, triisobutylene, 5-hydroxydodecene-1 and the like. Preferred olefins are aliphatic hydrocarbons of either the internal or terminal (alpha) type. Examples of such preferred olefins are dodecene-2, eicosene-3, octadecene-5, 3,5,7,9-pentamethyldodecene-1, 2-butyloctene-1, cyclododecene, octacosene-2, triacontatriene-2, 5,7 - heptadecadiene-1,16, and the like. Acyclic α-hydrocarbon monoolefins are more preferred. Examples of these olefins are tetracontene-1, dodecene-1, decene-1, 2-hexyloctene-1, 7,9 - dimethyldodecene-1, 3-butyloctene-1, undecene-1, hexatriacontene-1, docosene-1, heptacosene-1, tridecene-1, 5 - methyldecene-1, pentadecene-1 and the like. Mixtures of olefins are also useful in the present invention.

Commercial mixtures of olefins can also be used in the present process. These commercial olefin mixtures are generally a mixture of various homologous olefins such as $C_{12}$, $C_{14}$, $C_{16}$ olefins; $C_{10}$, $C_{12}$, $C_{14}$ olefins; $C_{10}$, $C_{11}$, $C_{12}$, $C_{13}$, $C_{14}$ olefins; $C_{12}$, $C_{14}$ olefins; $C_{13}$, $C_{15}$, $C_{17}$ olefins; $C_{12}$, $C_{13}$, $C_{14}$, $C_{15}$, $C_{16}$ olefins; $C_{22}$, $C_{24}$, $C_{26}$ olefins; $C_{30}$, $C_{32}$, $C_{34}$, $C_{36}$ olefins; $C_{40}$ and higher olefin mixtures and the like. These commercial mixtures are synthesized for example by Ziegler catalyst polymerization of low molecular weight olefins such as ethylene or propylene; by dehydrogenation of suitable paraffins and the like. These commercial olefin mixtures can obtain branched as well as straight-chain olefins; alpha as well as internal olefins. The mixed olefins thus obtained might also contain minor amounts of $C_6$ to $C_8$ olefins, non-homologous olefins, as well as non-olefin components. Such non-olefin components might be paraffins, alkyl halides, alcohols and the like; the nature of the non-olefin components is to a great degree dependent on the synthesis route utilized. The mixed olefins obtained from such a commercial synthesis need not be separated into the individual components to be useful. Mixtures containing even carbon numbered olefins ranging from about $C_{10}$ to about $C_{32}$ wherein the α-moiety predominates are especially useful; such mixtures ranging from about $C_{10}$ to about $C_{14}$ are particularly useful. By predominates I mean that more than 50 percent by weight of the olefins are alpha.

The solvents which are used in the present carboxylation process are generally liquid organic compounds of the ketone or ether class. Typical solvents are the alkyl ketones having up to about 11 carbon atoms such as diisobutyl ketone, cyclohexanone, methylethyl ketone, methylisobutyl ketone, diamyl ketone, cyclohexylethyl ketone and the like; and alkyl ethers having from 4 to about 16 carbon atoms such as diethyl ether, 1,4-dioxane, di-n-butyl ether, di-n-hexyl ether, diisopropyl ether, N-alkylmorpholines, di-2-ethylhexyl ether, $C_1$–$C_4$ dialkylglycol ethers and polyethers such as 1,2-diethoxy ethane, bis[2(2-methoxyethoxy)ethyl]ether, 1,2-diisopropoxy propane, 1,2-dimethoxy ethane and the like. Mixtures of these solvents can also be used. The ketone solvents are more preferred, and acetone is especially preferred.

The amount of solvent used in the present process is a controlling characteristic of the invention. In order to effect the unexpected improvement in the rate of carboxylation of $C_{10}$ and higher olefins, the amount of solvent used must be less than 60 percent and more than 20 percent, and preferably from about 30 percent to about 50 percent, by weight of the minimum amount of solvent which is required to form a solution, at room temperature, of the olefin and water reactants. In other words, if 100 parts by weight of a ketone or ether is the quantity required at room temperature to form a solution of a $C_{10+}$ olefin and water, the present process in a preferred embodiment, requires the use of only 30 to 50 parts by weight of the solvent. A concentration of about 40 percent by weight (as defined above) of the solvent is most preferred. The data presented below will illustrate the unexpected effectiveness of this narrow solvent range on the rate of reaction. The unexpected effectiveness of this narrow solvent range on the isomerization of α-olefin starting material will also be illustrated.

The catalysts which are used in the present process are cobalt containing systems. The effective catalyst is thought to be a hydrido carbonyl complex; and thus any cobalt containing compound, cobalt metal and the like which can yield such a complex under the reaction conditions can be used in the present process. Cobalt carbonyl is quite conveniently used. The amount of catalyst which can be employed is generally from about 0.001 to about 0.2 mole of cobalt metal per mole of olefin reactant.

Water is also a reactant in the present process. The amount of water used can be varied. Ordinarily, at least one mole of water per double bond in the olefin component is provided. Using a monoolefin for illustration purposes, the molar ratio of olefin:water can range from 1:1 to 1:6 or higher. Olefin: water molar ratios ranging from 1:2 to about 1:6 are preferred. An olefin:water molar ratio of 1:3 is conveniently used.

The process is ordinarily carried out under pressure. This pressure is primarily due to the carbon monoxide (CO) reactant. Thus, pressures ranging from about 750 to about 10,000 pounds per square inch (p.s.i.) can be used. Reaction pressures of 1,000 p.s.i. to about 3,500 p.s.i. are preferred.

The process of the present invention is generally carried out at elevated temperatures. Temperatures over about 100° C. are generally used. A preferred reaction temperature range is from about 125° C. to about 175° C. A most preferred reaction temperature is about 150° C.

The product obtained in the present carboxylation process is a mixture of acid isomers comprising linear acid as well as branched acid. This can be illustrated by the following reaction equation:

$$R-CH=CH_2 + HOH + CO \xrightarrow[\text{Solvent}]{\text{Cat.}}$$

$$R-CH_2-CH_2-\overset{O}{\underset{\|}{C}}-OH + R-CH-\underset{\underset{CH_3}{|}}{CH}-\overset{O}{\underset{\|}{C}}-OH$$

Linear    Branched

When using a linear α-olefin as one of the reactants under the conditions as heretofore described, the concentration of linear acid in the product ranges around 50° percent. The addition of small amounts of a pyridine to the above-described process markedly increases the percentage of linear acid obtained. This linearity promoting effect of a pyridine is another embodiment of the present invention.

The pyridines which may be used as promoters in the present process include pyridine itself as well as substituted pyridines such as alkyl pyridines (for example, beta picoline, the lutidines, 2-methyl-5-ethylpyridine), α-bromopyridine, 4-chloropyridine, 3-nitropyridine, acyl pyridines e.g. 4-acetylpyridine, 3-benzoylpyridine, and the like. Pyridine is a most preferred promoter.

The concentration of pyridine promoter is conveniently based on the amount of cobalt present as the cobalt catalyst. Expressed in terms of molar ratio of pyridine:cobalt (in cobalt catalyst), useful promoter ratios are 4:1 to 10:1, with a 5:1 ratio being most preferred. Ratios of pyridine:cobalt higher than this tend to reduce the acid yield while ratios below about 4:1 do not significantly improve the linearity of the acid product.

The following series examples will serve to illustrate the carboxylation step of the present invention. All percentages are by weight unless otherwise indicated. The reactants and the solvents were deaerated before use.

Example 1

This example illustrates the carboxylation process when the amount of acetone required to form a solution of dodecene and water at room temperature is used.

A suitable autoclave was charged with 125 mmoles (millimoles) of dodecene-1, 375 mmoles of water, about 100 grams of acetone and 4.4 mmoles of cobalt carbonyl $[Co_2(CO)_8]$. These reactants were reacted under a stream of nitrogen. The autoclave was then sealed and flushed twice with carbon monoxide. The autoclave was then charged with carbon monoxide. The mixture was then heated to 150° C. with stirring, the pressure rising to 1,500 p.s.i.; the reaction was continued at this temperature for 3 hours. The autoclave was cooled to room temperature and it was vented.

The conversion of dodecene-1 was 100%. The yield of tridecanoic acids in the product was 53.8%, 63.8% of which was linear acid. The product also contained 41.9% internal olefin. The analysis of the product was made by gas liquid chromatography (GLC).

Example 2

This example illustrates the carboxylation process when about 60% of the amount of acetone used in Example 1 is utilized.

An autoclave was charged with 125 mmoles dodecene-1, 375 mmoles of water, about 60 grams of acetone and 4.4 mmoles of cobalt carbonyl. These reactants were added under a stream of nitrogen. The autoclave was then sealed and flushed with carbon monoxide. Carbon monoxide was charged to the autoclave and the mixture was then heated with stirring to 160° C., the pressure rising to 1,750 p.s.i.; the reaction was continued at this temperature for 2 hours. The autoclave was then cooled to room temperature and it was vented.

The conversion of dodecene-1 was 100%. The yield of tridecanoic acid was 62.2%. Of this acid yield 61.2% was a linear acid; the product also contained 31% internal olefin. The analysis of the product was made by GLC.

Example 3

This example illustrates the carboxylation process when the amount of acetone used is only 20% of the amount used in Example 1.

An autoclave was charged with 125 mmoles of dodecene-1, 375 mmoles of water, about 20 grams of acetone and 4.4 mmoles of cobalt carbonyl. The reactants were added under a stream of nitrogen. The autoclave was then sealed and flushed with carbon monoxide. Carbon monoxide was charged to the autoclave. The mixture was then heated to 150° C. with stirring with the pressure rising to 1,750 p.s.i.; the reaction was continued at this temperature for 3 hours. The autoclave was then cooled to room temperature and it was vented.

The conversion of dodecene-1 was 100%. Analysis of the product showed it to contain 21.4% tridecanoic acid; 68.2% of the acid was the linear acid. The product also contained 73.3% internal olefin. Analysis was made by GLC.

The following examples illustrate the process of the present invention in which the amount of acetone solvent used is 40% of the amount used in Example 1.

Example 4

An autoclave was charged with 125 mmoles of dodecene-1, 375 mmoles of water, about 40 grams of acetone and 4.4 mmoles of cobalt carbonyl. These reactants and catalyst were added under a stream of nitrogen. The autoclave was then sealed and flushed with carbon monoxide. Carbon monoxide was then charged to the autoclave and the mixture was heated to 150° C. with stirring, the pressure rising to 1,500 p.s.i.; the reaction was continued at this temperature for 3 hours. The autoclave was then cooled to room temperature and it was vented.

The conversion of dodecene-1 was 100%. The yield of tridecanoic acid in the product was 87%. These tridecanoic acids were 61.7% linear. The product also contained 9% internal olefin. Analysis of the product was made by GLC.

Good results are also obtained at pressures of 1,000 p.s.i. and 3,500 p.s.i. Comparable yields of $C_{11}$ acids or $C_{18}$ acids are obtained when decene-1 or heptadecene-1 respectively is substituted for dodecene-1 in Example 4.

Example 5

An autoclave was charged with 125 mmoles of dodecene-1, 375 mmoles of water, about 40 grams of acetone and 8.8 mmoles of cobalt carbonyl. These reactants and catalyst were added under a stream of nitrogen. The autoclave was then sealed and flushed with carbon monoxide. Carbon monoxide was then charged to the autoclave. The mixture was then heated to 160° C. with stirring, the pressure rising to 1,750 p.s.i.; the reaction was continued at this temperature for 2 hours. The autoclave was then cooled to room temperature and it was vented.

The conversion of dodecene-1 was 100%. The yield of tridecanoic acids was 83.7%, of which 52.5% was linear acid. The product also contained 8.4% internal olefin. Analysis of the product was made by GLC.

1,2-dimethoxy ethane used in an equivalent amount in place of acetone in Example 5 yields comparable results.

Example 6

An autoclave was charged with 125 mmoles of dodecene-1, 375 mmoles of water, about 40 grams of acetone and 4.4 mmoles of cobalt carbonyl. These reactants and catalyst were added under a stream of nitrogen. The autoclave was then sealed and flushed with carbon monoxide. Carbon monoxide was then charged to the autoclave and the mixture was heated to 150° C. with stirring, the pressure rising to 1,500 p.s.i. The reaction was continued at this temperature for 3 hours. The autoclave was then cooled to room temperature and it was vented.

The conversion of dodecene-1 was 100%. The yield of tridecanoic acid was 85.7% The linearity of the acid product was 52.6%. The product also contained 11.7% internal olefin. Analysis of the product was made by GLC.

Similar results are obtained when about 30 grams of acetone are used in Example 6.

Example 7

An autoclave was charged with 125 mmoles dodecene-1, 375 mmoles of water, about 40 grams of acetone and 4.4 mmoles of cobalt carbonyl. These reactants and catalyst were added under a stream of nitrogen. The autoclave was then sealed and flushed with carbon monoxide. Carbon monoxide was then charged to the autoclave and the mixture was heated to 150° C. with stirring, the pressure rising to 1,500 p.s.i. The reaction was continued at this temperature for 3 hours. The autoclave was then cooled to room temperature and it was vented.

The conversion of dodecene-1 was 100%. The yield of tridecanoic acid was 90.8%. The acid linearity was 42.9%; and the product also contained 10.5% internal olefin. The analysis of the product was made by GLC.

Similar results are obtained when about 50 grams of acetone are used in Example 7.

Example 8

An autoclave was charged with 125 mmoles dodecene-1, 375 mmoles of water, about 40 grams of acetone and 4.4 mmoles of cobalt carbonyl. These reactants and catalyst were added under a stream of nitrogen. The autoclave was then sealed and flushed with carbon monoxide. Carbon monoxide was then charged to the autoclave and the mixture was heated to 150° C. with stirring, the pressure rising to 1,500 p.s.i. The reaction was continued at this temperature for 3 hours. The autoclave was then cooled to room temperature and it was vented.

The conversion of dodecene-1 was 100%. The yield of tridecanoic acid was 91.4%. The acid linearity was 47.3%. The product contained 5.4% internal olefin. The analysis of the product was made by GLC.

In Examples 1-8 the reactant ratios, the catalyst, and the reaction conditions were substantially the same. The only difference in each example was the amount of acetone used as the solvent. By comparing the results obtained in Examples 1, 2, and 3 with Examples 4, 5, 6, 7, and 8, it is quite apparent that when between about 30% and about 50% of the amount of acetone required to form a solution of the reactants at room temperature, is used, a significant improvement in acid yield and a significant reduction in internal olefin in the product, is obtained. Following is a table setting out the acetone concentrations, the acid yield and internal olefin in the product for Examples 1-8.

TABLE 1.—EFFECT OF SOLVENT QUANTITY

| | Acetone | | Reaction time (hours) | Percent | |
|---|---|---|---|---|---|
| Example | Grams | Required for solution, percent [1] | | Acid yield | Internal olefins |
| 1 | 100 | 100 | 3 | 53.8 | 41.9 |
| 2 | 60 | 60 | 2 | 62.2 | 31.0 |
| 3 | 20 | 20 | 3 | 21.4 | 73.3 |
| 4 | 40 | 40 | 3 | 87.0 | 9.0 |
| 5 | 40 | 40 | 2 | 83.7 | 8.4 |
| 6 | 40 | 40 | 3 | 85.7 | 11.7 |
| 7 | 40 | 40 | 3 | 90.8 | 10.5 |
| 8 | 40 | 40 | 3 | 91.4 | 5.4 |

[1] Percent of the minimum amount of acetone required to form a solution of the dodecene-1 and water reactants at room temperature.

The data in the table clearly shows that acid yield of over 83% is obtained when less than 60% and more than 20% of the amount of acetone required at room temperature to make a solution of the dodecene-1 and water reactants is used in the carboxylation reaction (Examples 4-8). Furthermore, the data shows that the amount of internal olefin found in the product is substantially reduced.

The present carboxylation system is also effective with internal olefins. The following example illustrates this effectiveness.

Example 9

An autoclave is charged with 125 mmoles of random dodecene (this random dodecene contains about 90% internal dodecenes), 375 mmoles of water, about 40 grams of acetone and 4.4 mmoles of cobalt carbonyl. The autoclave is then sealed and flushed with carbon monoxide.

The carbon monoxide is charged to the autoclave to a pressure of about 1,500 p.s.i. The mixture is then heated to 150° C. with stirring, and the reaction is continued at this temperature for 3 hours. The mixture is then cooled to room temperature and the autoclave is vented.

The product recovered is a mixture of tridecanoic acids with yield and linearity slightly lower than that obtained for a comparable run made with dodecene-1.

Good results are also obtained when the reactions of Examples 4–9 are carried out at temperatures of 125° C., 175° C., or 160° C. Other olefins disclosed such as pentadecene-1, decene-2, octadecene-3, a commercial mixture $C_{10}$–$C_{32}$ olefin, eicosene-1, cyclododecene, oleic acid and the like, give comparable yields of carboxylic acids of one carbon atom more than the starting olefin when used in place of dodecene in the above examples. Methylethyl ketone, diamyl ketone, 1,2-diethoxy ethane, and bis-[2(2-methoxyethoxy)ethyl]ether are equally effective in the above examples when used in place of acetone in equivalent quantities. The processes of Examples 4–9 can also be carried out at CO pressures (measured at the reaction temperature) of 1,000 p.s.i., 3,500 p.s.i., or higher. Although the olefin to water ratios in the above examples are 1:3, good results are also obtained when olefin:water molar ratios of 1:1 and 1:6 are used; or when cobalt chelates (e.g. acetylacetonate) or cobalt salts (e.g. acetate, benzoate, nitrate) are used as catalysts.

The following examples serve to illustrate the linearity promoting effect of small amounts of a pyridine. All parts are by weight unless otherwise noted. Olefin, water and solvent components were deaerated before use.

Example 10

This example is the control run in which no pyridine promoter was used.

An autoclave was charged with 125 mmoles of dodecene-1, 375 mmoles of water, about 40 grams of acetone and 4.4 mmoles of cobalt carbonyl. The autoclave was flushed twice with carbon monoxide. Carbon monoxide was then charged to the autoclave. The mixture was then heated to 150° C. with stirring, the pressure rising to 1,750 p.s.i. and the reaction was continued at this temperature for 3.5 hours. The autoclave was cooled to room temperature and then vented.

The yield of tridecanoic acids obtained was 87.3%, of which 54.7% was linear acid. The product also contained 8% internal olefins. The analysis of the product was made by GLC.

Example 11

The process of Example 10 was repeated except that the reaction time was 3 hours and about 4 grams of pyridine was also added in the reaction mixture. This amount of pyridine gives a pyridine:cobalt molar ratio of about 5:1.

The yield of tridecanoic acids obtained was 88%, of which 68.5% was linear acid. The product also contained 4.8% internal olefins. The analysis of the product was made by GLC. Comparable yields of $C_{11}$ acids or $C_{18}$ acids are obtained when decene or heptadecene respectively is used in place of dodecene in Example 11.

Similar results are obtained when pyridine is used at a pyridine:cobalt ratio of 4:1.

Example 12

The process of Example 11 was repeated except that the reaction time was 4 hours.

The yield of tridecanoic acids was 82.3%, of which 71.5% was linear acid. The product also contained 4.6% internal olefins. Analysis was made by GLC.

Similar results are obtained with 2-chloropyridine, 3-nitropyridine, a lutidine, or α-picoline is used in place of pyridine in Example 12.

Example 13

The process of Example 10 was repeated except that the amount of acetone used was about 34 grams and 7.5 grams of pyridine were also added. This amount of pyridine gives a pyridine:cobalt ratio of about 10:1.

The yield of tridecanoic acids obtained was 59.3%, with 79% being linear acid. The product also contained internal olefins.

Data from Examples 10–13 is tabulated below.

TABLE 2.—PROMOTER EFFECT OF PYRIDINE

| Example | Pyridine, grams | Pyridine: cobalt (molar ratio) | Percent Acid linearity | Linearity increase |
|---|---|---|---|---|
| 10 | None | | 54.7 | |
| 11 | 4 | 5:1 | 68.5 | +13.8 |
| 12 | 4 | 5:1 | 71.5 | +16.8 |
| 13 | 7.5 | 10:1 | 79 | +24.3 |

Comparing the linearity of product obtained in Examples 11–13 (pyridine promoted) with that obtained in Example 10 (no pyridine) the promoter effect of small amounts of pyridine is readily apparent. Pyridine:cobalt ratios of 5:1 to 10:1 increase the product acid linearity by up to 24%.

Other pyridines such as bromopyridine, chloropyridine, α-picoline are equally effective as promoters in amounts sufficient to give a pyridine:cobalt ratio of 4:1, 6:1, 9:1, and 10:1. Improved linearity of carboxylic acids obtained from $C_{10}$–$C_{32}$ mixed commercial olefins, triacontene-1, tetradecene-4, cyclododecene, 2-butylheptadecene-1 is also effected by the use of pyridine promoters.

After the carboxylation process is carried out under the conditions described above, the reaction mixture is treated as will be described below to recover the cobalt catalyst in the mixture. This cobalt catalyst recovery is effected by treating this reaction mixture with a $C_2$–$C_3$ monocarboxylic acid. Suitable acids are acetic acid and propionic acid. Acetic acid is a preferred acid.

The $C_2$–$C_3$ alkanoic acids are added as aqueous solutions. Generally, from 5% to 50% by weight of the $C_2$–$C_3$ acid in water can be used. Although the concentration of $C_2$–$C_3$ acid in water is not critical, sufficient aqueous solution should be used to (1) provide at least 2 moles of $C_2$–$C_3$ acid per mole of cobalt in the reaction mixture, and (2) provide enough water in the reaction mixture so that two layers are formed when the mixture is cooled to room temperature.

As mentioned above, the amount of $C_2$–$C_3$ aqueous acid should be at least two moles per mole of cobalt present in the mixture. A slight molar excess of acid can be used, for example, 2½ to 3 moles of acid per mole of cobalt present; a larger excess of $C_2$–$C_3$ acid is generally avoided.

After the $C_2$–$C_3$ aqueous acid has been added, the reaction mixture is heated (generally to 50° C. to 175° C.) for a period of time; generally, from 10 to 120 minutes is sufficient. On cooling the mixture to room temperature it forms two layers. The lower layer containing the cobalt catalyst is separated from the supernatant layer by any suitable means.

The cobalt catalyst containing layer thus separated can be used directly as the catalyst in the carboxylation process described above. Before use in the process, this cobalt containing aqueous solution is generally condensed by evaporating some of the water, preferably under vacuum. Condensation of cobalt containing solution again improves handling and permits easier control of catalyst quantities in the carboxylation process.

The cobalt catalyst recovered as described above is effective as a carboxylation catalyst. However, using this recovered catalyst carboxylation process requires an induction period of up to about 2 hours. In order to virtually eliminate this induction period, the treatment of the reaction mixture with the $C_2$–$C_3$ acid is preferably carried out under carbon monoxide, in the substantial absence of hydrogen, at pressures ranging from 50 p.s.i. to about 500 p.s.i. By substantial absence I mean that the carbon monoxide contains less than about 0.02 molar percent of hydrogen. When the catalyst recovery is carried out under carbon monoxide, the recovered catalyst does not require any induction period when used in the carboxylation process.

It is also advisable, where the recovered catalyst is not used immediately for carboxylation, that it be stored in the absence of air, e.g. under nitrogen. Where the catalyst is recycled directly and immediately as in a continuous process, exposure to air is less likely to occur.

The following examples illustrate the process of the present invention including the catalyst recovery step. All percentages are by weight unless otherwise noted.

Example 14

An autoclave was charged with 125 mmoles (millimoles) of dodecene-1, 375 mmoles of water, 4.4 mmoles of cobalt carbonyl [$Co_2(CO)_8$] and about 40 grams of acetone. The autoclave was flushed twice with carbon monoxide. Carbon monoxide was then charged to the autoclave. The mixture was then heated to 150° C., the pressure rising to 1,750 p.s.i. The reaction was continued at this temperature for 3 hours. At the end of this time, the autoclave was allowed to cool to room temperature and it was vented. The reaction mixture was then treated with a solution of about 20 grams of water and about 5 ml. (milliliters) of glacial acetic acid. The reaction mixture was then heated with stirring at 60° C. for 30 minutes. The mixture was then transferred to a separatory funnel and allowed to cool to room temperature. At this point the mixture separated into two layers. The lower layer was pink in color. This lower layer contained the recovered cobalt catalyst. It was physically separated from the upper layer and it was concentrated to 13 grams by heating under vacuum.

The 13 grams of recovered catalyst was then charged into an autoclave with 21 grams of dodecene-1, and about 40 grams of acetone. The autoclave was then flushed twice with carbon monoxide. Carbon monoxide was then charged to the autoclave and the reaction mixture was heated to 150° C., pressure rising to 1,750 p.s.i. It was noted that the carboxylation process (uptake of carbon monoxide) began to proceed only after 2 hours. The reaction was then continued for 3 additional hours. At the end of this time the autoclave was allowed to cool and it was vented.

The yield of tridecanoic acid obtained was 84.4%, of which 54.1% was linear acid. Analysis was made by GLC.

Example 15

An autoclave was charged with 125 mmoles of dodecene-1, 375 mmoles of water and 4.4 mmoles of cobalt carbonyl and about 40 grams of acetone. The autoclave was flushed twice with carbon monoxide. Carbon monoxide was then charged to the autoclave. The mixture was then heated to 150° C., the pressure rising to 1,750 p.s.i. The reaction was continued at this temperature for 3 hours. At the end of this time, the autoclave was allowed to cool to room temperature and it was vented. To the reaction mixture was added about 25 grams of a 20% (by volume) aqueous acetic acid. The autoclave was then pressured to 200 p.s.i. with carbon monoxide and heated to 150° C. The mixture was stirred at this temperature for 1 hour at which time the autoclave was cooled to room temperature and vented. The mixture was then transferred to a separatory funnel and the lower, pink, aqueous layer was separated. This aqueous layer contained the recovered cobalt catalyst. It was concentrated to 13.5 grams under reduced pressure. (The pink aqueous layer containing the cobalt catalyst was in this instance handled under an inert gas, namely, nitrogen.) The concentrated catalyst was used immediately in the following reaction.

An autoclave was charged with 13.5 grams of concentrated cobalt as obtained above, 21 grams of dodecene-1, and about 40 grams of acetone. The autoclave was flushed twice with carbon monoxide. Carbon monoxide was then charged to the autoclave and it was heated to 150° C. The pressure rose to 1,750 p.s.i. It was noted that the carboxylation process (uptake of carbon monoxide) proceeded immediately and that no induction was required. The reaction was continued with stirring at this temperature for 3 hours. The autoclave was cooled to room temperature and vented.

The yield of tridecanoic acids was 65.2%, of which 54.3% were the linear acid. Analysis was made by GLC.

Example 16

An autoclave was charged with 125 mmoles of dodecene-1, 375 mmoles of water, about 36 grams of acetone, about 5 grams of pyridine, and 44 mmoles of cobalt carbonyl. The autoclave was flushed twice with carbon monoxide. Carbon monoxide was then charged into the autoclave. The reaction mixture was then heated to 150° C. with stirring, the pressure rising to 1,750 p.s.i. The reaction was continued for 3 hours. The autoclave was then cooled to room temperature and it was vented.

To this reaction mixture was added 50 milliliters of 20% (by volume) aqueous acetic acid solution. The autoclave was then heated to 150° C. and 200 p.s.i. of carbon monoxide were charged thereto. After 1 hour at this temperature and pressure the autoclave was cooled to room temperature and vented. The reaction mixture was transferred to a separatory funnel. The lower aqueous layer which contained the recovered cobalt catalyst was then withdrawn. This layer was then concentrated to about 13.5 grams by heating the aqueous solution under vacuum. Air was carefully excluded while the cobalt containing layer was being processed.

The 13.5 grams of concentrated recovered cobalt catalyst was then charged to an autoclave along with 21 grams of dodecene-1 and about 40 grams of acetone. The autoclave was flushed twice with carbon monoxide. Carbon monoxide was charged to the autoclave and it was heated to 150° C., the pressure rising to 1,750 p.s.i. The reaction was continued with stirring for 4 hours. At the end of this time, the autoclave was cooled to room temperature and it was vented.

The yield of tridecanoic acids obtained wac 90%, of which 75.5% was the linear acid. Analysis was by GLC.

Example 17

An autoclave was charged with 125 mmoles of dodecene-1, 375 mmoles of water, about 36 grams of acetone, about 5 grams of pyridine, and 44 mmoles of cobalt carbonyl. The autoclave was flushed twice with carbon monoxide. Carbon monoxide was then charged into the autoclave. The reaction mixture was then heated to 150° C. with stirring, the pressure rising to 1,750 p.s.i. The reaction was continued for 3 hours. The autoclave was then cooled to room temperature and it was vented.

To this reaction mixture was added 30 milliliters of 10% (by volume) aqueous acetic acid solution. The autoclave was then heated to 150° C. and 350 p.s.i. of carbon monoxide were charged thereto. After 1 hour at this temperature and pressure the autoclave was cooled to room temperature and vented. The reaction mixture was transferred to a separatory funnel. The lower aqueous layer which contained the recovered cobalt catalyst was then withdrawn. This layer was then concentrated to about 13.5 grams by heating the aqueous solution under vacuum. Air was carefully excluded while the cobalt containing layer was being processed.

The 13.5 grams of concentrated recovered cobalt catalyst was then charged to an autoclave along with 21 grams of dodecene-1 and about 40 grams of acetone. The autoclave was flushed twice with carbon monoxide. Carbon monoxide was charged to the autoclave and it was heated to 150° C., the pressure rising to 1,750 p.s.i. The reaction was continued with stirring for 4 hours. At the end of this time, the autoclave was cooled to room temperature and it was vented.

The yield of tridecanoic acids obtained was 78.2%, of which 67.5% was the linear acid. Analysis was by GLC.

Similar results are obtained with 2½ moles of propionic acid or 3 moles of acetic acid per mole of cobalt are used in Examples 14–17. After addition of the $C_2$–$C_3$ acid in the recovery step, the mixture can be heated for from 10, 30, 75, or 120 minutes at temperatures ranging from about 50° C. to about 175° C. with similar results. In carrying out the recovery under carbon monoxide pressure (in the substantial absence of hydrogen), the carbon monoxide pressure may range from 50 p.s.i. up to 500 p.s.i. or higher if desired; results similar to those in Examples 15–17 are obtained. The catalyst recovery is also effective when any of the olefins described herein as being useful reactants are carboxylated.

The tridecanoic acid yield in Examples 14–17 is that obtained from the reaction using the recovered cobalt catalyst.

Examples 14 to 17 clearly show that the cobalt catalyst can be simply and successfully recovered from a completed carboxylation reaction; and used directly to catalyze another carboxylation reaction. Examples 15–17 show the advantage of carrying out the catalyst recovery step under carbon monoxide pressure in the substantial absence of hydrogen.

Examples 14 to 17 illustrate the integral carboxylation/catalyst recovery/carboxylation process being carried out as a step-wise or batch process. Although this batch-type procedure is useful, the process of the present invention is not limited to this type of system. It can also be utilized and perhaps preferably utilized, in a continuous type process. The continuous type process would be of special advantage from a commercial standpoint.

When mixtures of olefins are used in the present invention, mixtures of carboxylic acids are obtained. For example, if a commercial mixture of $C_{10}$, $C_{12}$, and $C_{14}$, predominantly, α-monoolefins is used in the present process, the product obtained is a mixture of $C_{11}$, $C_{13}$, and $C_{15}$ acids. As with any of the acid products obtained in the present process, the acids may be used as such or separated by conventional procedures before use.

The acid products of the present process have many uses, e.g. as chemical intermediates in soap manufacture.

Having fully described the process of the present invention it is desired that it be limited only within the spirit and scope of the following claims.

I claim:
1. A process for preparing carboxylic acids which comprises
    (1) reacting olefin having about 10 or more carbon atoms with water and carbon monoxide using a cobalt catalyst in the presence of a solvent selected from the class consisting of alkyl ketones having up to 11 carbon atoms and alkyl ethers having from about 4 to about 16 carbon atoms, the amount of solvent used being from about 30 percent to about 50° percent by weight of the amount of said solvent which is required to form a solution of the olefin and water at room temperature, said reaction being carried out at temperatures ranging from 125° C. to 175° C., and at pressures of at least 750 p.s.i., whereby a carboxylic acid is produced,
    (2) treating the resultant reaction mixture of step (1) with an aqueous solution of a $C_2$–$C_3$ monoalkanoic acid, at temperatures ranging from 125° C. to 175° C., said treatment causing said reaction mixture to form two layers on cooling to room temperature,
    (3) separating the cobalt containing layer from the supernatant layer containing said carboxylic acid, and
    (4) thus recovering cobalt catalyst suitable for direct use in step (1).

2. The process of claim 1 wherein said treatment in step (2) is carried out under 100 p.s.i. to 500 p.s.i. of carbon monoxide in the substantial absence of hydrogen gas.

3. The process of claim 1 wherein said olefin is a mixture of even carbon numbered olefins ranging from about $C_{10}$ to about $C_{14}$.

4. The process of claim 1 wherein said olefin is a hydrocarbon α-monoolefin and said solvent is a ketone.

5. The process of claim 2 wherein said olefin is a hydrocarbon monoolefin, said solvent is a ketone.

6. The process of claim 5 wherein said ketone is acetone and said $C_2$–$C_3$ monoalkanoic acid is acetic acid.

7. The process of claim 6 wherein said olefin is dodecene-1.

8. The process of claim 1 wherein step (1) is carried out in the presence of a linearity promoting quantity of a pyridine, the quantity of said pyridine being such that the molar ratio of pyridine:cobalt is from about 4:1 to about 10:1.

9. The process of claim 8 wherein said treatment in step (2) is carried out under 100 p.s.i. to 500 p.s.i. of carbon monoxide in the substantial absence of hydrogen gas.

10. The process of claim 8 wherein said olefin is a hydrocarbon α-monoolefin and said solvent is a ketone.

11. The process of claim 9 wherein said olefin is hydrocarbon α-monoolefin and said solvent is a ketone.

12. The process of claim 11 wherein said ketone is acetone.

13. The process of claim 12 wherein said $C_2$–$C_3$ monoalkanoic acid is acetic acid.

14. The process of claim 13 wherein said olefin is dodecene-1.

References Cited
UNITED STATES PATENTS

| | | | |
|---|---|---|---|
| 2,768,968 | 10/1956 | Reppe et al. | 260—413 X |
| 2,831,029 | 4/1958 | Vergilio et al. | 260—413 X |
| 2,911,422 | 11/1959 | Ercoli | 260—413 |

LORRAINE A. WEINBERGER, Primary Examiner

R. D. KELLY, Assistant Examiner

U.S. Cl. X.R.

260—408, 419, 515 R, 514 C